United States Patent [19]
Pasin

[11] 3,807,380
[45] Apr. 30, 1974

[54] CHARCOAL GRILL

[76] Inventor: Mario A. Pasin, 50 Baybrook Ln., Oakbrook, Ill. 60521

[22] Filed: Dec. 11, 1972

[21] Appl. No.: 314,020

[52] U.S. Cl.............................. 126/25 R, 126/9 B
[51] Int. Cl............................................. F24b 3/00
[58] Field of Search ...... 126/25 R, 25 A, 9 B, 25 B, 126/9 R

[56] References Cited
UNITED STATES PATENTS

| | | | |
|---|---|---|---|
| 3,153,136 | 10/1964 | Mell | 126/25 B X |
| 3,421,493 | 1/1969 | Miller | 126/25 R |
| 3,424,145 | 1/1969 | Stitt | 126/25 R |
| 2,221,098 | 11/1940 | Langsam | 126/25 R |
| 2,666,426 | 1/1954 | Pollard | 126/25 R |

FOREIGN PATENTS OR APPLICATIONS

| | | | |
|---|---|---|---|
| 3,093 | 2/1878 | Germany | 126/25 R |

*Primary Examiner*—William F. O'Dea
*Assistant Examiner*—Harold Joyce

[57] ABSTRACT

A charcoal grill having an open-ended body portion and a grate adapted to rest across the open end of the body portion which includes a bottom wall of the body portion having corrugations in its top surface, and a rake which extends through an opening in one of the side walls with a handle portion on the end outwardly of the body portion and a pronged member on the end portion within the body portion and in which the rake is dimensioned to have a length to enable the prong portion to reach throughout the body portion.

8 Claims, 2 Drawing Figures

PATENTED APR 30 1974 3,807,380

CHARCOAL GRILL

This invention relates to charcoal stoves and more particularly to grills which make use of briquettes of charcoal for heat generation.

It is an object of this invention to produce a charcoal stove or grill which is simple in construction and easy in operation; which embodies means for enabling redistribution of the little charcoal briquettes for heat adjustment and/or ash removal, without the need for removal of the grill for access to the interior of the stove; and which embodies means for uniform and complete air circulation about the burning briquettes for more complete and uniform combustion.

Figure 1:
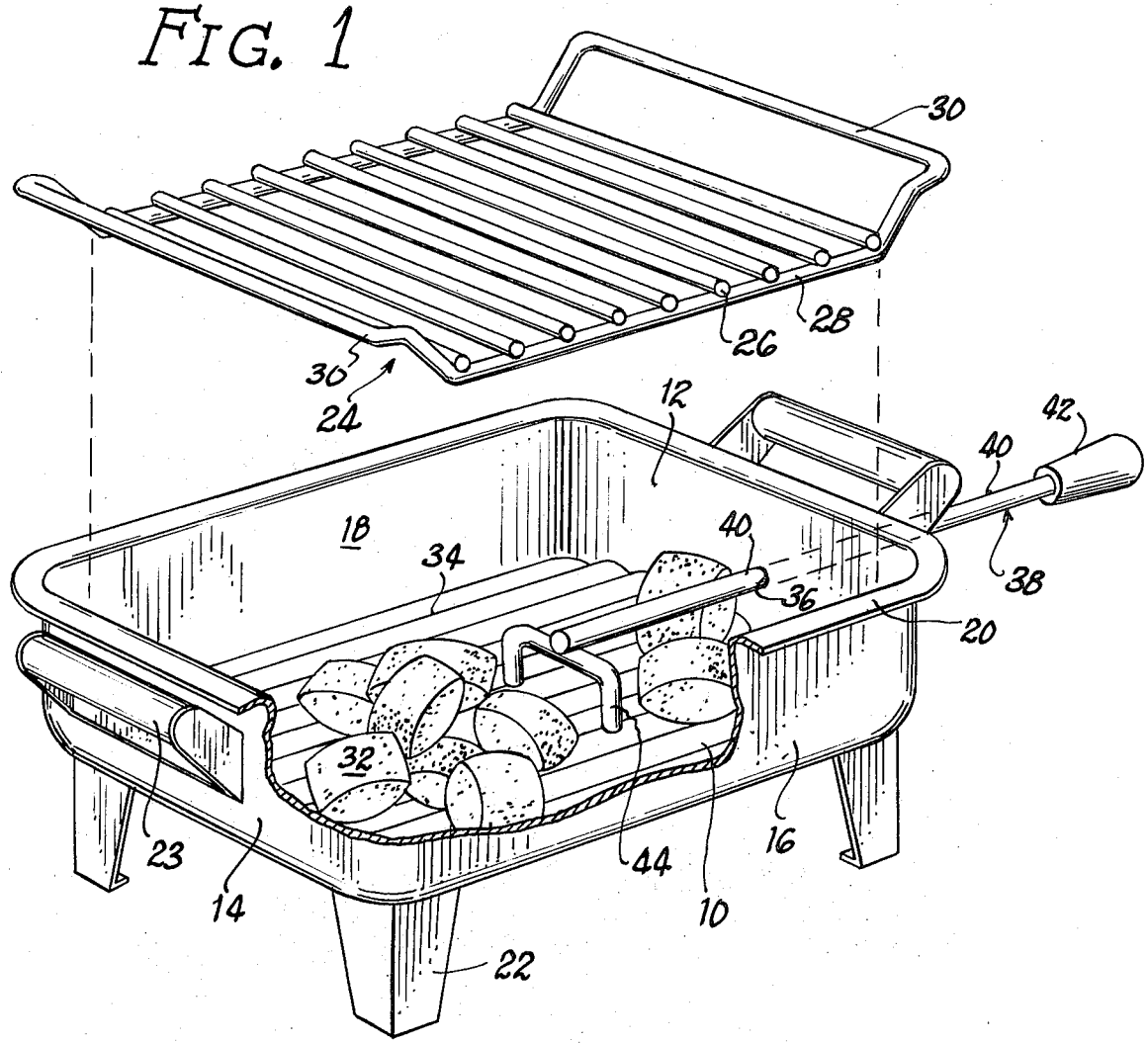
Figure 2:
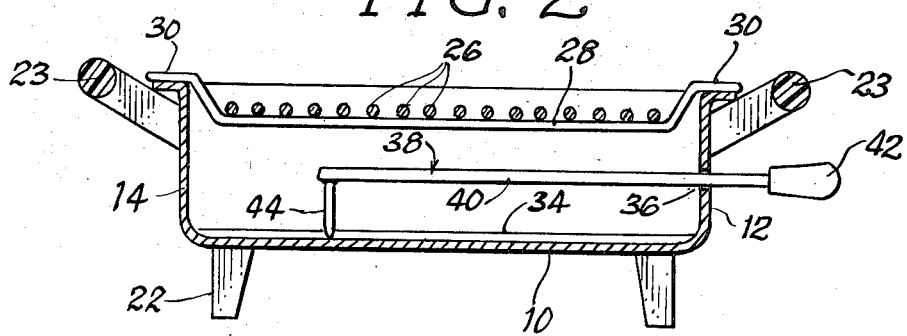

These and other objects and advantages of this invention will hereinafter appear and for purposes of illustration, but not of limitation, an embodiment of the invention is shown in the accompanying drawing, in which:

FIG. 1 is a perspective elevational view of the charcoal stove embodying the features of this invention with the elements shown in their relative positions, and FIG. 2 is a sectional elevational view of the grill shown in FIG. 1.

Briefly described, the charcoal grill embodying the features of this invention comprises a dished body portion of heat resistant metal, such as steel, cast iron and the like, and which, in the illustrated modification, comprises a rectangularly shaped member having a horizontally disposed bottom wall 10, side walls 12 and 14 and front and back walls 16 and 18, respectively, extending upwardly all around from the outer edges of the bottom wall 10 to a flanged, horizontally disposed lip portion 20 extending outwardly from the upper edges of the side wall, front and back wall members. The dished member is supported on legs 22 which extend downwardly from the corner portions of the bottom wall and handles 23 are secured to extend laterally and upwardly from the side walls to enable the stove to be carried about. It will be understood that the stove can be of others of the conventional shapes for a charcoal grill, such as of rounded shape, oval shape, or of semi-spherical shape, with a bottom wall and upwardly extending side walls.

The grill portion 24 comprises an open grill in the form of spaced rod-like members 26 extending crosswise or lengthwise in parallel relation and interconnected one with the others with means for supporting the grill in spaced relation above the bottom wall of the stove. In an illustrated modification, the grill is formed of a plurality of longitudinally spaced crosswise extending metal rods 26, dimensioned to have a length less and preferably only slightly less than the distance between the upper ends of the front and back walls 16 and 18 and joined to define a grill having a width which is also slightly less than the distance between the upper ends of the side walls 12 and 14 so that the metal grill member will be received within the open end of the rectangularly shaped member, preferably slightly below the upper end of the side and end walls.

The rods are joined by a metal wire frame 28 on which the grill rods 26 are disposed and which is formed to rectangular shape having a lengthwise dimension slightly less than the distance between the upper ends of the front and back walls 16 and 18 and a crosswise dimension which is greater than the distance between the upper ends of the side walls 12 and 14. The end portions 30 of the frame member, extending beyond the grill rods 26, are offset upwardly to define a central grill rod supporting portion at a lower level having a crosswise and lengthwise dimension which is less than the distance between the upper ends of the side and end walls whereby the central portion can be cradled into the open end at the top of the stove while the offset end portions extend beyond the side walls and rest on the lips 20 of the side walls for support.

In accordance with one concept of this invention, the charcoal briquettes 32 are supported on the bottom wall 10, or a grate, if a separate grate is provided for the support of the briquettes, in which the bottom wall or grate is formed with corrugations 34 in the top surface, with the corrugations preferably spaced by an amount less than the dimension of the briquettes so that the briquettes will be supported on the corrugated surface in spaced relation with the base of the corrugations to provide means for air circulation beneath the coals whereby better, more uniform and more complete burning can be achieved.

In accordance with an important concept of this invention, an opening 36 is provided in a side or end wall above the briquette supporting bottom wall and below the upper edge of the respective wall, and preferably about midway crosswise and vertically in the side wall 12 or 14. A rake 38, formed of a rod-like member 40 having a handle portion 42 at one end and a pronged member 44 at the other end, with the rod-like member 40 being dimensioned to be slightly less in cross-section than the cross-section of the opening 36 and extending therethrough in a manner to enable rotational movement, angular movement and lengthwise movement relative to the side wall, with the handle portion on the end portion extending outwardly of the stove and the pronged portion 44 on the end portion within the stove. The rod-like portion 40 is dimensioned to have a length greater than the distance between the aligned walls so that the pronged portion 44 can be manipulated by way of the outwardly extending handle portion 42 to reach any section within the interior of the stove. In the illustrated modification, the rake 38 is formed with a pronged portion 44 in the form of a U-shaped member, with the end of the rod 40 joined about midway along the base of the U. It will be understood that the rake can be formed with additional prongs or as a solid plate which extends substantially perpendicularly from the end of the rod portion.

The rake 38 finds multiple use in a charcoal grill of the type described. Usually, the charcoal briquettes 32 are ignited by a cal rod unit on which the briquettes 32 are piled, or they may be piled for ignition with a lighter fluid. In either event, after the briquettes have been ignited, it is desirable to distribute the briquettes on the supporting wall. This can be effectively and efficiently accomplished by the rake 38 without removal of the grill 24.

Often times, after broiling or cooking has progressed to a certain point, it is desirable to redistribute the coals for selected heat distribution, as by packing the coals to one side for use with a rotisserie, or removal of ignited briquettes from beneath a particular area for readjusting the amount of heat, or for adding more coals to increase the heat. All of this can be accomplished with the rake without the need for removal of the grill 24 and to gain access to the coals or to add coals to the fire.

The rake can be used to agitate the briquettes to effect the removal of ash which otherwise is retained by the coals on their surface thereby to increase the heat capable of being derived from the ignited coals.

It will be understood that changes may be made in the details of construction, arrangement and operation without departing from the spirit of the invention, especially as defined in the following claims.

I claim:

1. A charcoal grill comprising a dished member open at the top and having a bottom wall adapted to receive the charcoal briquettes and vertically disposed walls extending upwardly about the edges of the bottom wall, a grill dimensioned to rest on the upper edge of the dished member and to span the open end thereof, an opening through one of the vertically disposed walls, a rake having a shaft portion extending loosely through said opening including a handle on the end portion extending outwardly beyond the body portion and a head member extending substantially perpendicularly from the end portion of the shaft within the body portion in which the shaft portion is dimensioned to have a length greater than the distance between aligned walls of the dished member to enable the head member to reach the lined interior of the body portion.

2. A charcoal grill as claimed in claim 1 in which the head member comprises a member having two or more prongs extending substantially perpendicularly to the shaft portion.

3. A charcoal grill as claimed in claim 2 in which the spaced relation between prongs is less than the maximum dimension of the charcoal briquettes.

4. A charcoal grill as claimed in claim 1 in which the grill comprises a plurality of rods arranged in spaced apart parallel relation, a wire frame member underlying the rods with the frame member having a central depressed portion to which the rods are secured, in which the central depressed portion is dimensioned to have a length and width slightly less than the length and width of the open end of the body portion to enable the depressed portion to be cradled therein, and with end portions of the frame beyond the rod supporting portions extending upwardly to engage the upper edge of the body portion.

5. A charcoal grill as claimed in claim 1 in which the upper surface of the bottom wall is corrugated.

6. A charcoal grill as claimed in claim 5 in which the bottom wall forms the bottom wall of the body portion and the vertically disposed walls extend upwardly from the outer edges thereof.

7. A charcoal grill as claimed in claim 1 in which the bottom wall is a grate located within the body portion.

8. A charcoal grill as claimed in claim 1 in which the body portion is of substantially rectangular shape and the opening through which the rake member extends is in a side wall at a level above the bottom wall and below the upper edge of the side wall.

* * * * *